US006768770B1

(12) United States Patent
Lipperer et al.

(10) Patent No.: US 6,768,770 B1
(45) Date of Patent: Jul. 27, 2004

(54) TRANSCEIVER WITH BIDIRECTIONAL INTERNAL INTERFACE LINES

(75) Inventors: Georg Lipperer, München (DE); Peter Sehrig, Pöcking (DE); Josef Schmal, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/556,487

(22) Filed: Apr. 21, 2000

(30) Foreign Application Priority Data

Apr. 21, 1999 (DE) .......................................... 199 18 059

(51) Int. Cl.[7] .............................. H04L 5/16; G08B 5/22; H04Q 7/20
(52) U.S. Cl. ........................ 375/219; 340/7.42; 455/434
(58) Field of Search ................................ 375/219, 249; 370/356, 401; 455/76–86

(56) References Cited

U.S. PATENT DOCUMENTS

| | | | | | |
|---|---|---|---|---|---|
| 5,511,236 | A | * | 4/1996 | Umstattd et al. | ............ 455/76 |
| 6,570,871 | B1 | * | 5/2003 | Schneider | .................. 370/356 |
| 6,587,450 | B1 | * | 7/2003 | Pasanen | ...................... 370/338 |
| 6,606,483 | B1 | * | 8/2003 | Baker et al. | ................ 455/126 |

FOREIGN PATENT DOCUMENTS

| DE | 19719658 A1 | 9/1998 | | |
|---|---|---|---|---|
| DE | 19528069 C2 | 10/1998 | | |
| EP | 0 866 588 A2 | * | 9/1998 | ........... H04L/27/30 |

OTHER PUBLICATIONS

D. Sallaerts et al., A 270 kbits/s 35 mW Modulator IC for GSM Cellular Radio Hand–Held Terminals,Sep. 23, 1998, 1990 IEEE International Solid–State Circuits Conf.—Digest of Technical Papers, pp. 34–35.*

D. Sallaerts et al.: „A 270kbits/s 35 mW Modulator IC for GSM Cellular Radio Hand–Held Terminals, 1990 IEEE International Solid–State Circuits Conference—Digest of Technical Papers, 1990, pp. 34–35.

* cited by examiner

*Primary Examiner*—Stephen Chin
*Assistant Examiner*—Cicely Ware
(74) *Attorney, Agent, or Firm*—Laurence A. Greenberg; Werner H. Stemer; Ralph E. Locher

(57) ABSTRACT

A transceiver has bidirectional internal interface lines which can be connected to a baseband circuit. The transceiver is switchable by the baseband circuit between a transmission mode and a reception mode. The internal interface lines are connected to at least one quadrature modulator which in the transmission mode is connected to the interface lines, and to a quadrature demodulator which in the reception mode is connected to the interface lines. In the alternative, the demodulator is set to high impedance in the transmission mode and the modulator is set to high impedance in the reception mode.

11 Claims, 3 Drawing Sheets

TRANSCEIVER WITH BIDIRECTIONAL INTERNAL INTERFACE LINES

BACKGRONND OF THE INVENTION

Field of the Invention

The invention relates to a transceiver which can be connected to a baseband circuit of a mobile phone via bidirectional internal interface lines.

By way of example, cellular mobile radio networks operate according to the GSM standard (GSM = global system for mobile communications). In a time division multiplex mode (TDMA = time division multiplex access) useful data are transmitted within so-called time slots. Conventional mobile phones have a modulator for transmitting the data and a demodulator for receiving the data.

German patent application DE 197 19 658 A1 describes a transceiver for radio-frequency channels. The transceiver has a baseband circuit which is fed in the reception mode by a demodulator and in the transmission mode feeds a quadrature modulator. At the antenna end, a changeover switch is provided for switching over between the transmission path and the reception path.

German patent DE 195 28 069 C2 describes a radio unit with a signal processor. In a reception mode, the signal processor is fed by a demodulator. In a transmission mode, the signal processor feeds a modulator. A controller serves to switch over an antenna-end changeover switch so that, depending on the mode of operation, either the reception path is activated by means of the demodulator or the transmission path is activated by means of the modulator. The control signals which are output by the controller are also fed to the demodulator and the modulator.

FIG. 1 shows the structure of a conventional mobile phone as in the prior art. Via a reception line RX, a demodulator D receives reception data which are fed to an analog/digital converter A/D via an in-phase line I, an inverted in-phase line Ī, a quadrature-phase line and an inverted quadrature-phase line Q̄. The A/D converter converts the analog signals into digital data and outputs it to the digital baseband circuit B of the mobile phone. Conversely, in the transmission mode the digital baseband circuit outputs the data to a digital/analog converter D/A which converts the digital data into analog signals and forwards them to a modulator M via an in-phase line I, an inverted in-phase line Ī, a quadrature-phase line Q and an inverted quadrature-phase line Q̄. The modulator M generates a modulated transmission signal as a function of the received analog signals, and outputs the modulated transmission signal via a transmission line TX.

In conventional mobile phones, the modulator M and the demodulator D are integrated in a single circuit S1, while the baseband circuit B is integrated with the analog/digital converters and the digital/analog converters in a circuit S2. As shown in FIG. 1, the two integrated circuits S1, S2 are connected via a total of eight interface lines if a quadrature modulation method as in the case of GSM is used.

The integrated transmission and reception circuit S1 has not only the demodulator D and the modulator M but also a multiplicity of further, non-illustrated components which are required for the transmission and reception modes. The components include, for example, PLL circuits, voltage-controlled oscillators, and voltage-regulation switching devices. These components are connected by means of a multiplicity of non-illustrated control lines to the baseband circuit of the mobile phone on the one hand, and to the transmission stage and the reception stage on the other hand. Furthermore, the integrated circuit S1 requires housing terminals or pins for connection to the supply voltage and to ground. Owing to the desired miniaturization, the number of available housing terminals in the integrated circuit S1 is, however, limited. For this reason, owing to the insufficient number of available housing terminals, desired ground connections are dispensed with in conventional transceivers for mobile phones, as a result of which the operating properties are degraded.

A further disadvantage of transceivers in conventional mobile phones is that the high number of interface lines to the baseband circuit leads to a high level of susceptibility to interference because the useful data which are easily falsified by external influences are transmitted on these lines. For this reason, these interface lines have to be shielded in a costly fashion and protected against interference using capacitors. This leads, on the one hand, to increased costs in manufacture and at the same time restricts the possibilities of further miniaturization of the mobile phone.

SUMMARY OF THE INVENTION

The object of the invention is to provide a transceiver which overcomes the above-noted deficiencies and disadvantages of the prior art devices of this general kind, and which can be connected to a baseband circuit of a mobile phone with as few interface lines as possible.

With the above and other objects in view there is provided, in accordance with the invention, a transceiver selectively operable in a transmission mode and a reception mode, the transceiver comprising:

bidirectional internal interface lines for connection to a base circuit;

a quadrature modulator connected to the bidirectional internal interface lines in a transmission mode of the transceiver; and a quadrature demodulator connected to the bidirectional internal interface lines in a reception mode of the transceiver.

In other words, the transceiver according to the invention has bidirectional internal interface lines which can be connected to a baseband circuit of a mobile phone, the transceiver being capable of being switched over between a transmission mode and a reception mode by the baseband circuit, and at least one quadrature modulator which in the transmission mode is connected to the interface lines via transmission lines, and has at least one quadrature demodulator which in the reception mode is connected to the interface lines via reception lines.

In an advantageous refinement of the transceiver according to the invention, the quadrature demodulator is switched to high impedance in the transmission mode, and the quadrature modulator is switched to high impedance in the reception mode.

This provides the particular advantage that the interface lines can be operated in both directions without the frequency response of the quadrature demodulator being influenced by the quadrature modulator in the reception mode, and conversely the frequency response of the quadrature modulator is not influenced by the quadrature demodulator in the transmission mode.

In accordance with an added feature of the invention, the quadrature modulator and the quadrature demodulator are electronically completely isolated from one another.

In accordance with an additional feature of the invention, a multiplex switching device is connected between the internal interface lines and the quadrature demodulator and a multiplex switching device is connected between the internal interface lines and the quadrature modulator. When the transmission and reception lines are switched by means of multiplex switching devices, the result is a particularly advantageous switching over between transmission mode and reception mode which is effected quickly and reliably with little circuit complexity.

In accordance with another feature of the invention, a multiplex control circuit is connected via internal control lines to the multiplex switching devices. Furthermore, there may be provided a control line for connecting the multiplex control circuit to the baseband circuit of the mobile phone. This provides the particular advantage that the switching over between transmission mode and reception mode can be controlled by the baseband circuit via a single control line, with the result that only one housing terminal pin of the transceiver is required to do so.

In accordance with a further feature of the invention, the transmission and reception lines each include in-phase and quadrature-phase lines.

In particular, the transmission and reception lines each include an in-phase line, an inverted in-phase line, a quadrature-phase line, and an inverted quadrature-phase line.

In accordance with again an added feature of the invention, the modulator is a GMSK modulator and the demodulator is a GMSK demodulator.

In accordance with a further alternative of the invention, the modulator is a QAM modulator and the demodulator is a QAM demodulator.

In accordance with again another feature of the invention, the modulator is a PSK modulator and the demodulator is a PSK demodulator.

In accordance with again a further feature of the invention, the transmission and reception modes of the transceiver are each maintained at least for a duration of a time slot of a TDMA data channel access.

In accordance with a concomitant feature of the invention, the above-outlined transceiver is utilized as a transmitter and a receiver for the baseband circuit of a mobile telephone.

Other features which are considered as characteristic for the invention are set forth in the appended claims.

Although the invention is illustrated and described herein as embodied in transceiver with bidirectional internal interface lines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
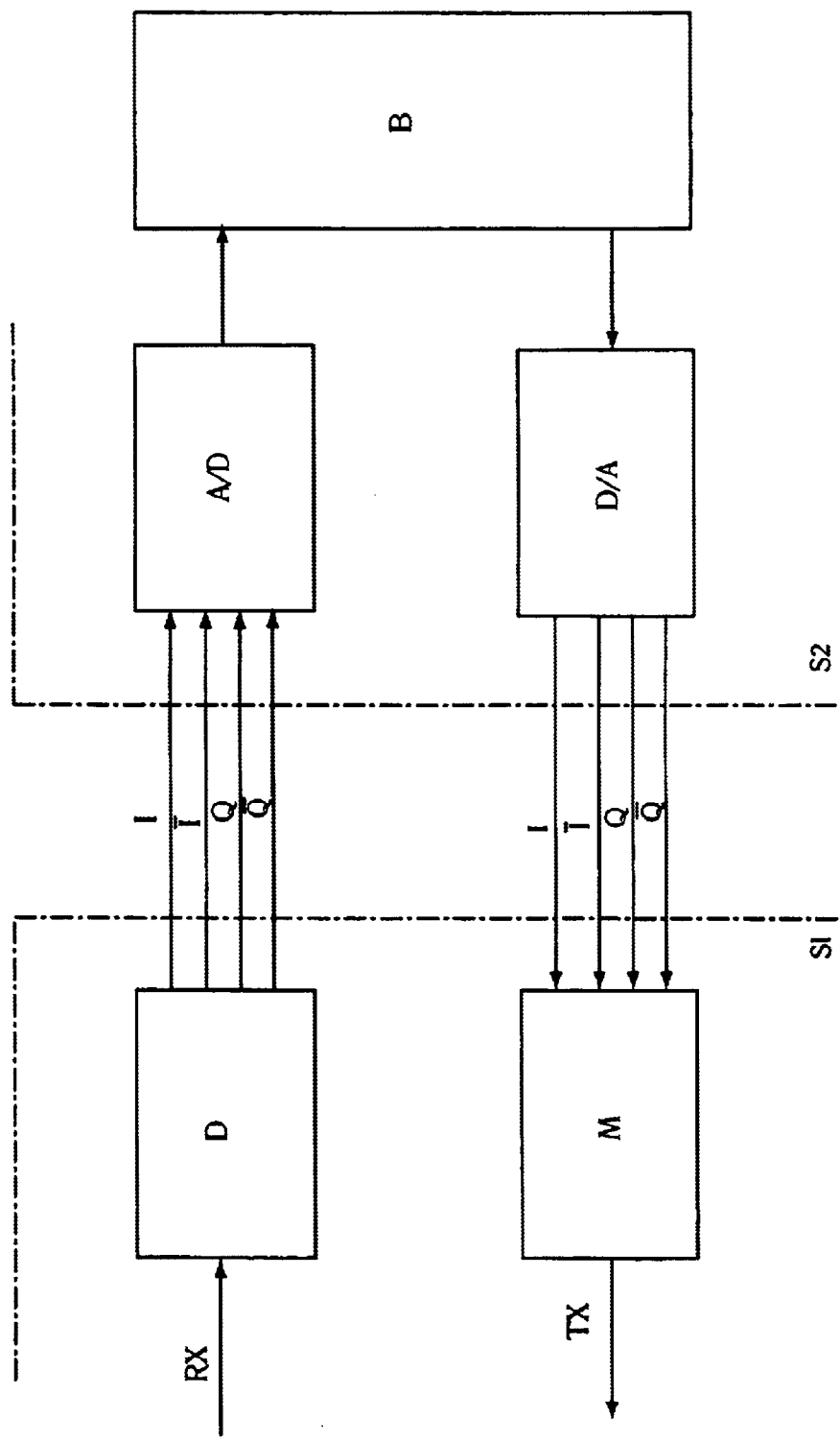
FIG. 1 is a diagrammatic view showing the connection of a conventional transceiver to a baseband circuit according to the prior art.

Referring now to the figure of the drawing showing the invention in detail, the transceiver according to the invention is integrated in a housing 1. The transceiver contains a quadrature demodulator 2 and a quadrature modulator 3. The quadrature demodulator 2 is connected to a radio-frequency reception stage via a reception line 4. The quadrature modulator 3 is connected to a radio-frequency transmission stage via a transmission line 5. Here, in the reception mode, the quadrature demodulator receives a telecommunications reception signal via an antenna and the radio-frequency stage. In the transmission mode, the modulator 3 transmits a telecommunications transmission signal via the transmission line 5, and the radio-frequency transmission stage transmits one via the antenna. The quadrature modulator 3 and the quadrature demodulator 2 are operated using a TDMA time division multiplex method in accordance with the GSM standard. In doing so, they can preferably transmit signals in the GSM 900, GSM 1800 and GSM 1900 frequency bands. The quadrature demodulator 2 and the quadrature modulator 3 permit the phase and the amplitude to be modulated. For this reason, it is possible to use any desired modulation method in which the amplitude, the phase or the amplitude and the phase are modulated simultaneously, such as GMSK modulation, MSK modulation, and QAM modulation, for example.

The quadrature demodulator 2 is connected to a first multiplex switching device 10 via an in-phase signal line 6, an inverted in-phase line 7, a quadrature signal line 8 and an inverted quadrature signal line 9. The multiplex switching device 10 has internal switches 11, 12, 13, 14 which can be switched over simultaneously from a first switched state into a second switched state by means of a control line 15. In the closed state, the switches 11, 12, 13, 14 output the analog reception signals present on the lines 6, 7, 8, 9 by means of lines 16, 17, 18, 19 via internal connection nodes 20, 21, 22, 23 to internal interface lines 24, 25, 26, 27 which can be used bidirectionally. The received analog signals which are connected through pass via the bidirectional internal interface lines 24, 25, 26, 27 to housing terminal pins 28, 29, 30, 31 on the housing 1 of the transceiver according to the invention. The received analog reception signals are transmitted from the housing 1 of the transceiver according to the invention to a further integrated circuit 36 via bidirectional external interface lines 32, 33, 34, 35. The integrated circuit 36 contains an analog/digital converter 37, a digital/analog converter 38 and a baseband circuit 39 for a mobile phone. A microphone and a loud speaker can be connected to the baseband circuit 39. The integrated circuit 36 has housing terminal pins 40, 41, 42, 43 for connection to the housing terminal pins 28, 29, 30, 31 of the transceiver 1 according to the invention via the external bidirectional interface lines 32, 33, 34, 35. The housing terminal pins 40, 41, 42, 43 of the integrated circuit 36 are led via internal bidirectional interface lines 44, 45, 46, 47 to branching points 48, 49, 50, 51 at which they branch to reception lines 52, 53, 54, 55 and transmission lines 56, 57, 58, 59. The reception lines 52, 53, 54, 55 are fed to the analog/digital converter 37 which converts the received analog signals into digital signals and outputs them to the baseband circuit 39 via lines 60.

Figure 2:
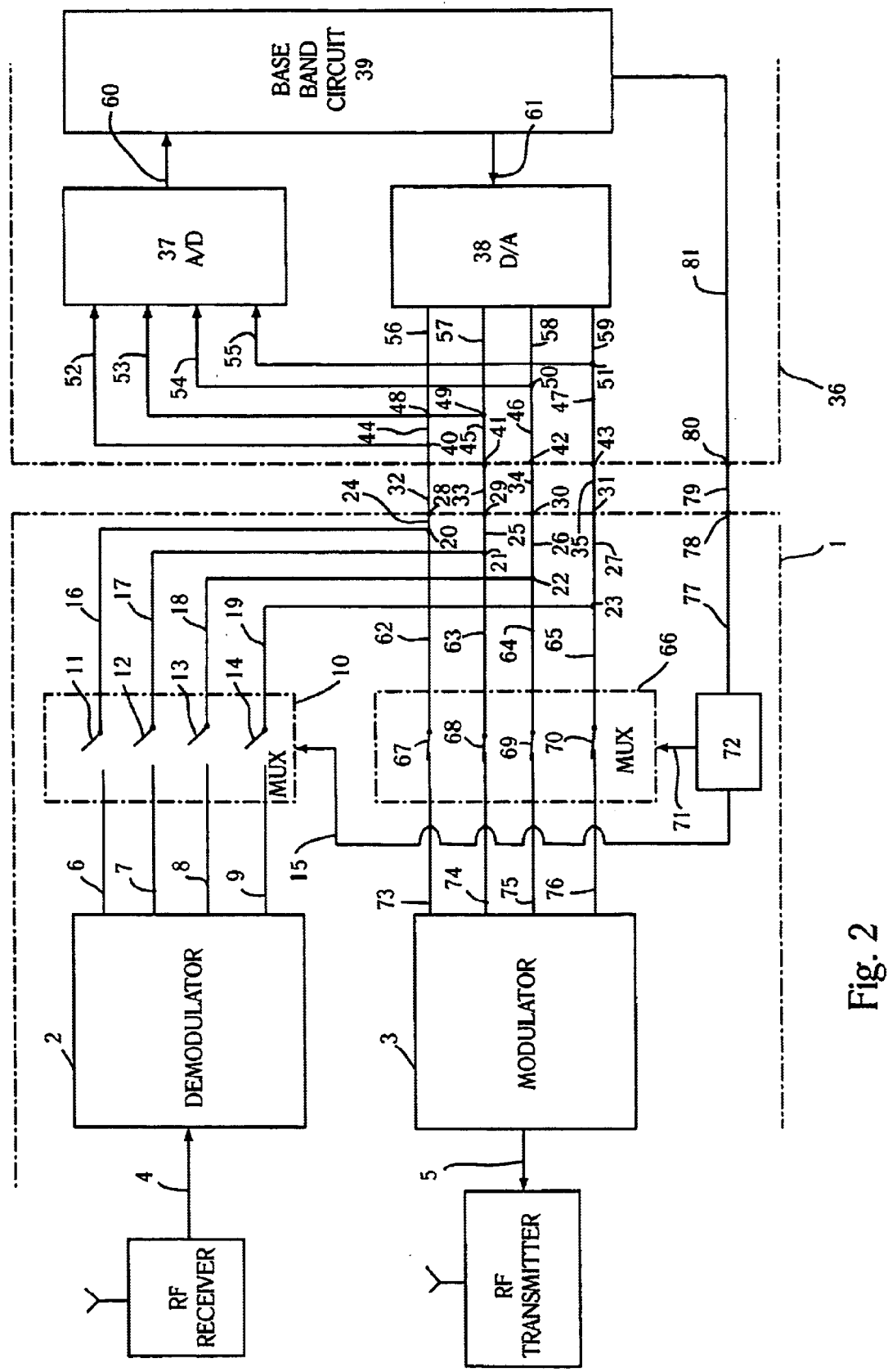
FIG. 2 is a diagrammatic view of the transceiver according to the invention connected to a baseband circuit of a mobile phone.

In the transmission mode, the baseband circuit 39 outputs digital transmission signals via lines 61 to the digital/analog converter 38 which converts the digital transmission signals into analog transmission signals. The analog transmission signals pass via the internal transmission lines 56, 57, 58, 59 and the internal bidirectional interface lines 44, 45, 46, 47 to the housing terminal pins 40, 41, 42, 43 of the integrated circuit 36. From there they are applied, via the bidirectional external interface lines 32, 33, 34, 35, to the housing terminal pins 28, 29, 30, 31 of the housing 1 in which the transceiver according to the invention is located. The analog transmission signals are also applied to internal transmission signal lines 62, 63, 64, 65 via the internal bidirectional interface lines 24, 25, 26, 27 of the transceiver according to the invention. The internal transmission signal lines 62, 63, 64, 65 are capable of being switched by means of a second multiplex device 66. The second multiplex switching device 66 has four internal switches 67, 68, 69, 70. These internal switches 67, 68, 69, 70 can be switched by means of an internal control line 71 which connects the second multiplex switching device 66 of the transceiver according to the invention to an internal control circuit 72. If the switches 67, 68, 69, 70 of the second multiplex switching device 66 are closed, as illustrated in FIG. 2, the quadrature modulator 3 receives the analog transmission signals via internal lines 73, 74, 75, 76.

The internal control circuit 72 provided in the housing 1 of the transceiver according to the invention to switch the multiplexers 10 and 66 is connected via an internal control line 77 to a housing terminal pin 78 which is connected via an external control line 79 to a housing terminal pin 80 of the integrated circuit 36. The baseband circuit 39 outputs a control signal via an internal control line 81 of the second integrated circuit 36 to the switch-over control device 72 via the lines 80, 77.

In the transmission mode, the baseband circuit 39 controls the internal control circuit 72 of the transceiver according to the invention in such a way that the transceiver opens the internal switches 11, 12, 13, 14 of the multiplex switching device 10 via the control lines 15, 71 and closes the internal switches 67, 68, 69, 70 of the second multiplex device 66. Conversely, in the reception mode, the baseband circuit 39 controls the internal control circuit 72 of the transceiver according to the invention in such a way that said control circuit 72 closes the internal switches 11, 12, 13, 14 of the first multiplex switching device 10 via the control lines 15, 71, and opens the internal switches 67, 68, 69, 70 of the second multiplex switching device 66.

Figure 3:
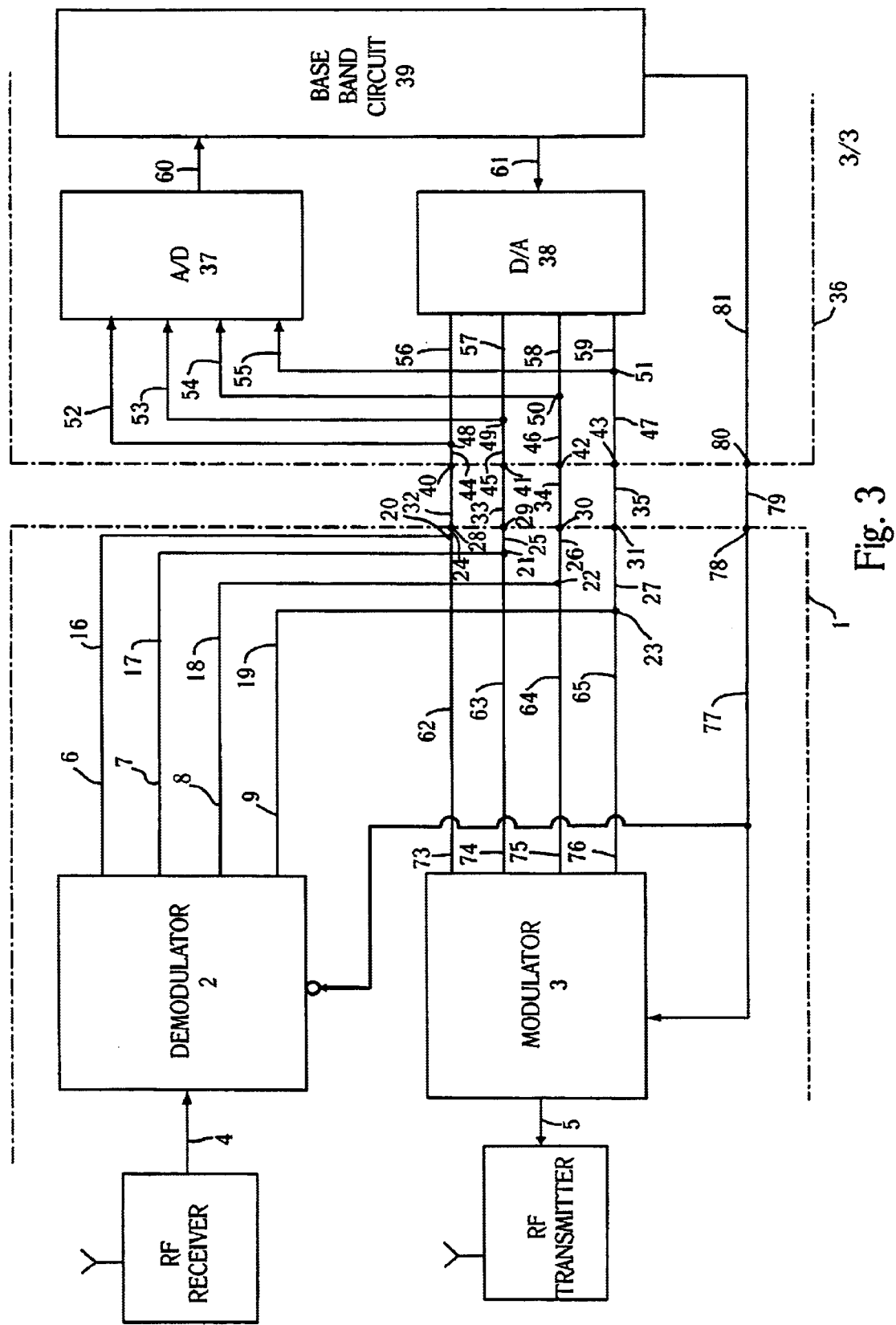
FIG. 3 is a diagrammatic view of the transceiver according to a variant of the invention.

In an advantageous embodiment of the invention, the switch-over is not carried out by additional multiplex switching devices 10, 66 but rather by direct switching of the quadrature modulator 3 and of the quadrature demodulator 2. This is illustrated in FIG. 3. In this embodiment, in the reception mode the quadrature modulator 3 is switched to high impedance, with the result that the quadrature modulator does not influence the frequency response of the quadrature demodulator during the reception of the telecommunications transmission signals. Conversely, in the transmission mode the quadrature demodulator 2 is switched to high impedance, with the result that the quadrature demodulator 2 does not influence the frequency response of the quadrature modulator 3. The quadrature modulator 3 and the quadrature demodulator 2 are in this embodiment preferably completely electrically isolated from one another.

In a further advantageous embodiment of the transceiver according to the invention, the switch-over between transmission mode and reception mode is not controlled, as illustrated in FIGS. 2 and 3, by means of a separate dedicated control line, but rather by means of the interface lines between the integrated circuit 36 and the transceiver 1 according to the invention.

As can be seen directly by comparing the conventional prior art configuration illustrated in FIG. 1 with the novel configuration according to the invention illustrated in FIG. 2, the number of necessary interface lines between the integrated circuit 36 in which the baseband circuit of the mobile phone is located and the transceiver 1 according to the invention is reduced considerably. In fact, it is halved. This is achieved in that the transceiver according to the invention has internal interface lines 24, 25, 26, 27 which are used bidirectionally in the transmission mode and in the reception mode. As a result, in the exemplary embodiment illustrated in FIG. 2, only four housing terminal pins 28, 29, 30, 31 are reserved for the transmission of telecommunications data. The housing terminal pins which this frees up can be used for other functions, for example for grounding internal components of the transceiver. As a result, the operating properties of the transceiver are additionally improved. Furthermore, only four external interface lines 32, 33, 34, 35 have to be shielded from electromagnetic or mechanical interference, as a result of which the costs are reduced and further miniaturization is made possible. The number of blocking capacitors for reducing electromagnetic interference which are normally connected to the external interface lines is also reduced in the transceiver according to the invention because only four blocking capacitors are required in the embodiment illustrated in FIG. 2, in contrast to, for example, eight blocking capacitors in the conventional arrangement illustrated in FIG. 1. The saving in space, in particular when applied in mobile phones, is considerable here.

The internal interface lines 24, 25, 26, 27 of the transceiver according to the invention can be used bidirectionally because mobile radio transceivers always operate in half-duplex mode, i.e. one time slot is always used either only for transmitting or only for receiving data. In the transceiver according to the invention, the half-duplex mode defined by the GSM standard is used to half the number of housing terminal pins required for the telecommunications transmission, as a result of which, on the one hand, there is a saving in costs and in space and, on the other hand, the susceptibility to interference is additionally reduced.

We claim:

1. A transceiver selectively operable in a transmission mode and in a reception mode, the transceiver comprising:
 a transceiver housing;
 external bidirectional interface lines;
 housing terminal pins for connection of said transceiver housing with an integrated circuit via said external bidirectional interface lines;
 first and second multiplex devices;
 first and second internal lines;
 a quadrature demodulator switched to said housing terminal pins by said first multiplex device in a reception mode of said transceiver, said first multiplex device being connected to said housing terminal pins via said first internal lines said first internal lines being reception lines including an in-phase line, an inverted in-phase line, a quadrature-phase line and an inverted quadrature-phase line; and
 a quadrature modulator switched to said housing terminal pins by said second multiplex device in a transmission mode of said transceiver, said second multiplex device being connected to said housing terminal pins via said second internal lines said second internal lines being transmission lines including an in-phase line, an inverted in-phase line, a quadrature-phase line and an inverted quadrature-phase line.

2. The transceiver according to claim 1, which further comprises internal control lines, and a multiplex control circuit connected via said internal control lines to said multiplex devices.

3. The transceiver according to claim 2, which further comprises a baseband circuit of said integrated circuit, and a control line for connecting said multiplex control circuit to said baseband circuit.

4. The transceiver according to claim 1, wherein said first internal lines are reception lines including in-phase and quadrature-phase lines, and said second internal lines are transmission lines including in-phase and quadrature-phase lines.

5. The transceiver according to claim 1, wherein said quadrature modulator is a GMSK modulator and said quadrature demodulator is a GMSK demodulator.

6. The transceiver according to claim 1, wherein said quadrature modulator is a QAM modulator and said quadrature demodulator is a QAM demodulator.

7. The transceiver according to claim 1, wherein said quadrature modulator is a PSK modulator and said quadrature demodulator is a PSK demodulator.

8. The transceiver according to claim 1, wherein said transmission and reception modes of the transceiver are each maintained at least for a duration of a time slot of a TDMA data channel access.

9. In combination with a mobile phone, the transceiver according to claim 1 defining a transmitter and a receiver of the mobile phone.

10. A transceiver selectively operable in a transmission mode and in a reception mode, the transceiver comprising:

a transceiver housing;

external bidirectional interface lines;

housing terminal pins for connection of said transceiver housing with an integrated circuit via said external bidirectional interface lines;

first and second internal lines, said first internal lines being reception lines including an in-phase line, an inverted in-phase line, a quadrature-phase line and an inverted quadrature-phase line and said second internal lines being transmission lines including an in-phase line, an inverted in-phase line, a quadrature-phase line, and an inverted quadrature-phase line;

a quadrature demodulator connected to said housing terminal pins via said first internal lines, said quadrature demodulator being switched to high impedance in a transmission mode of said transceiver; and a quadrature modulator connected to said housing terminal pins via said second internal lines said quadrature modulator being switched to high impedance in a reception mode of said transceiver.

11. The transceiver according to claim 10, wherein said quadrature modulator and said quadrature demodulator are isolated from one another.

* * * * *